United States Patent

Savchenko et al.

[11] Patent Number: 6,111,567
[45] Date of Patent: Aug. 29, 2000

[54] SEAMLESS MULTIMEDIA BRANCHING

[75] Inventors: Alexander V. Savchenko, Bellevue; Vivek Nirkhe, Redmond; Yi Sun, Kirkland; Robert B. Nelson, Redmond, all of Wash.

[73] Assignee: Microsoft Corporation, Redmond, Wash.

[21] Appl. No.: 08/826,545

[22] Filed: Apr. 3, 1997

[51] Int. Cl.⁷ .................................................. G06F 17/30
[52] U.S. Cl. ........................... 345/302; 707/104; 709/103
[58] Field of Search ............................ 345/302; 707/104, 707/514, 512; 709/103, 102

[56] References Cited

U.S. PATENT DOCUMENTS

| | | | |
|---|---|---|---|
| 5,487,167 | 1/1996 | Dinallo et al. | 345/302 |
| 5,659,793 | 8/1997 | Escobar et al. | 345/302 |
| 5,680,619 | 10/1997 | Gudmundson et al. | 345/302 |
| 5,706,486 | 1/1998 | Cruz et al. | 345/302 |
| 5,708,845 | 1/1998 | Winstendahl et al. | 345/302 |
| 5,754,801 | 5/1998 | Lambrecht et al. | 710/128 |
| 5,758,093 | 5/1998 | Boezeman et al. | 345/302 |
| 5,781,188 | 7/1998 | Amiot et al. | 345/320 |
| 5,892,507 | 4/1999 | Moorby et al. | 345/302 |

OTHER PUBLICATIONS

Garofalakis et al., "On Periodic Resource Scheduling For Continuous Media databases", IEEE electronic library online, Feb. 1998.

Sen et al., "Proxy Prefix Caching for Multimedia Streams", IEEE electronic library online, Jan. 1999.

Gollapudi et al., "NetMedia: Client Server Distributed Multimedia Environment", IEEE electronic library online, Aug. 1996.

*Primary Examiner*—John E. Breene
*Assistant Examiner*—Greta L. Robinson
*Attorney, Agent, or Firm*—Lee & Hayes, PLLC

[57] ABSTRACT

Described above are methods of authoring multimedia titles and of storing and delivering multimedia content that implements guaranteed seamless branching on digital media with high seek latency and a fixed upper bound on this latency. Continuous media content is arranged as individual clips on a storage medium. Seamless branches between clips are identified by an author. A method is disclosed to identify individual clips as carrier clips or non-carrier clips to guarantee specified seamless behavior while optimizing bridge memory usage and availability of seamless jumps. Bridge data of a particular target media clip is interleaved or otherwise associated on the storage medium with a carrier clip that is upstream of the target media clip, and delivered along with the upstream media clip. As bridge data are delivered, they are stored in bridge memory, to be used to implement a subsequent seamless branch. After the branch is implemented or after the branch is no longer an option, the bridge data is cleared from the bridge memory. Additional methods are disclosed for dealing with intervening file access and for accounting for no-latency branches that are possible when using some forms of storage devices.

29 Claims, 6 Drawing Sheets

SEAMLESS MULTIMEDIA BRANCHING

TECHNICAL FIELD

This invention relates to multimedia titles having a plurality of media clips interconnected by seamless branches, to methods of authoring such multimedia titles, and to methods of scheduling data delivery during multimedia titles.

BACKGROUND OF THE INVENTION

Typical computer games and other multimedia programs are frequently distributed on removable optical storage media such as CD-ROMs (compact disc-read only memory) and DVDs. CD-ROMs are currently the most common media used for program distribution. DVDs, commonly referred to as digital video discs or digital versatile discs, use a high density optical disc format that has been in development for the past several years. DVD was introduced in Japan and Korea in late 1996, and is expected to be available in the US and other markets in 1997. There are several variations of the DVD format. DVD-Video is a format designed to deliver linear motion picture content. DVD-Audio is a format designed for audio. The term DVD-ROM is used to reference an optical storage medium that is formatted in accordance with the DVD standard.

Games and other programs such as these often use continuous data streams that are stored on the optical storage media for rendering during program execution. Such continuous data streams include video and audio streams. Digital video and audio streams are usually stored in a compressed and encoded format such as industry standards consisting of MPEG-2 Video, MPEG-2 Audio, and other MPEG-2 systems. MPEG stands for the Moving Picture Experts Group, which is a group that coordinates the definition of these standards.

Commonly used optical digital media typically have data stored in continuous spiral tracks. Continuous data can then be read in its proper order at high speeds by reading sequentially along the spiral of the media.

Many multimedia programs and games use a number of media clips that are tied together into a cohesive story under program control or according to user actions. This requires that a program or game be able to instantly switch from one continuous clip to another in response to user input, without any discernible rendering discontinuity or gap between clips. Such gaps are referred to as "seams." A continuous branch, without discontinuities, is referred to as a "seamless" jump or branch. As a specific example, a video game utilizes audio and video clips while allowing users to influence the particular sequence of rendered video clips. In some games, for instance, a user can manipulate a mouse or a joystick to change story lines and influence game outcomes. As the user makes choices, the game responds so that the audio and video appear to flow seamlessly. In many cases, the user at some point will have several different alternatives, and the game must react immediately to whichever of the alternatives is actually chosen by the user.

As used here, the term "clip" refers to a segment of data that is intended to be read and rendered as a stream and that is stored on a storage medium in such a way that it can be read from the storage medium at a rate that is at least as fast as the normal rate at which the data is intended to be rendered. In most cases, an individual media clip will be laid out contiguously along a spiral of a CD-ROM or DVD.

In addition to branching seamlessly to another clip, a program sometimes must access extraneous data files while playing a single media clip. For example, a game might need a data file containing a digitized sound effect of short duration (such as a "beep" to signal an error), which is to be rendered simultaneously with the primary audio and video. When the file must be obtained from the same CD-ROM or DVD, this is referred to as intervening file access.

When using storage media such as CD-ROMs and DVDs, seamless jumps between media clips are difficult to achieve. This is because of the relatively high latency these devices exhibit when switching between different physical locations on the media. The time required to access a different DVD location can be nearly ⅓ of a second. To preserve visual and audio continuity, something needs to be rendered during this time, even though new data is not available.

Existing solutions to this problem primarily involve some type of pre-loading. One solution, for example, requires caching the initial segments, referred to as bridge data, of all media clips that might potentially be the target of a seamless branch. When a branch is taken, the cached data is rendered while accessing the appropriate location on the storage medium. This approach is useful both for intervening file access and for branching from one media clip to another. However, this approach requires significant amounts of low-latency memory to store the bridge data for all available media clips. This is wasteful and expensive, and in some cases is simply not a possibility (such as in a consumer device with no hard disk). Furthermore, new video standards such as MPEG2 require high bandwidths and thus greatly increase the amount of low-latency memory that would be required to implement a pre-loading scheme such as described above.

Some solutions take advantage of storage device characteristics to provide seamless branching. For example, DVD-Video uses data interleaving for multiple angle viewing. Video clips from different camera angles are laid out in an interleaved manner. Angle of view can be changed seamlessly since the video clips corresponding to different camera angles can be delivered simultaneously. This technique has the advantage of requiring no caching beyond internal read-ahead buffering, but is very limited in scope. It cannot be used for general-purpose seamless branching such as used in games or other similar multimedia titles. In addition, some DVD-Video systems utilize a read-ahead buffer to store bridge data. This technique relies on the ability to read data faster than it can be consumed. While this approach is practical in some situations, it imposes limitations on the physical layout of clips. Also, there are many situations, such as where there are a plurality of available branches at a given time, where this approach simply will not work.

Some applications utilize more than one high-latency storage medium for rendering continuous media content, such as two CD-ROMs. However, this is an expensive solution, and requires equipment (two drives) that most users do not have.

SUMMARY OF THE INVENTION

The invention utilizes caching to achieve seamless branching. However, the invention reduces bridge memory requirements by scheduling bridge data for delivery from the storage device (such as a CD-ROM or DVD-ROM) just before it is needed. Bridge data is discarded after the point when the bridge data can no longer be utilized. This is in contrast to previous methods in which bridge data for all available media clips was cached before even beginning the rendering process.

When authoring a software title that utilizes continuous media, the media is divided into individual clips. Seamless jumps or branches are defined between the clips. For example, a game might allow jumps to clips B and C from clip A. Other jumps might be available from clips B and C.

Each clip is assigned to be either a carrier clip or a non-carrier clip. Bridge data is scheduled for delivery to bridge memory only during carrier clips. If A is a carrier clip having available branches to clips B and C, for example, bridge data for clips B and C will be delivered during the playback of initial parts of clip A. A branch to clip B or C will only be allowed after the bridge data is delivered. If this is a problem, and the game must allow an immediate branch from clip A, clip A is designated as a non-carrier clip, and the bridge data for clips B and C must be delivered during a media clip that is upstream from or previous to clip A.

Intervening files, referred to herein as data clips, are considered non-carrier clips. The bridge data for a data clip comprises the entire data clip.

This scheme allows an author to minimize and optimize bridge memory requirements. Specifically, the author can reduce bridge memory requirements by allowing media clips to be carrier clips. Given a particular assignment of carrier and non-carrier clips, bridge memory requirements can be easily calculated. In addition, the scheme accounts for storage device characteristics such as the availability of no-latency branches to further reduce bridge memory requirements.

DETAILED DESCRIPTION

Figure 1:
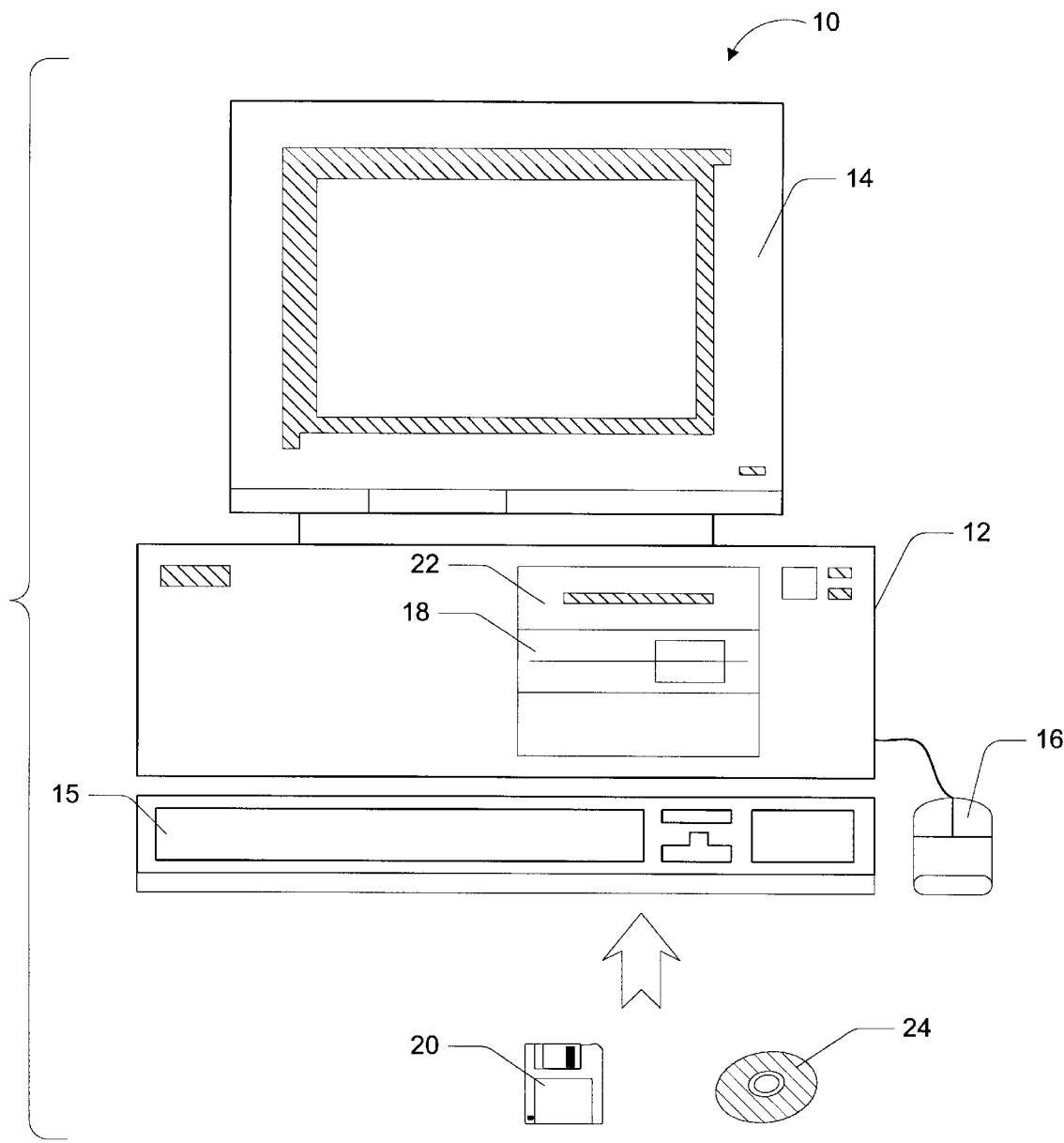
FIG. 1 shows a computer system in accordance with the invention.

FIG. 1 shows an example of a computer system for implementing the invention, generally designated by reference numeral 10. Computer system 10 in the illustrated embodiment is a conventional desktop IBM-compatible computer. System 10 has a central processing unit (CPU) 12, a display monitor 14, a keyboard 15, and a mouse 16. The computer 10 also utilizes a computer-readable storage medium such as a floppy memory diskette 20 in conjunction with a floppy disk drive 18. System 10 might also include another input device in addition to, or in lieu of, the keyboard 15 and mouse 16 including such devices as a track ball, stylus, or the like.

Computer system 10 also utilizes a computer-readable storage medium in the form of an optical storage medium 24, on which individual continuous media clips and other data are stored. Optical storage medium 24 will be referred to as the primary storage medium. An access device 22 allows programs executed on computer system 10 to access and read storage medium 24. The storage medium is of a type that imposes an access latency between media clips. In current devices, the access time is a result of moving a read head from one location to another of a rotating medium.

In the preferred embodiment of the invention, optical storage medium 24 is a CD-ROM or DVD. Access device 22 is a conventional drive unit configured to read from the CD-ROM or DVD. Typically, a multimedia title such as described herein is distributed in its entirety on optical storage medium 24.

Figure 2:
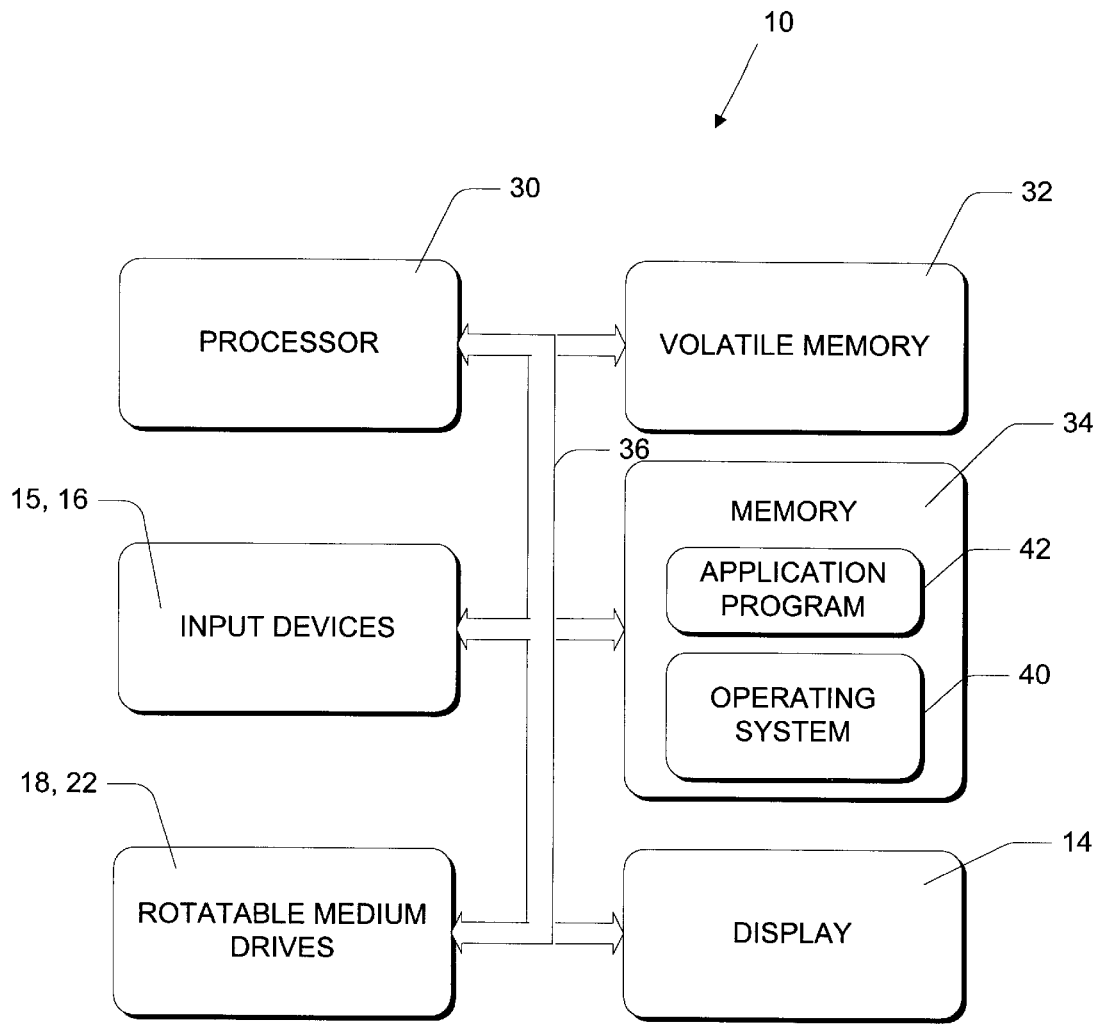
FIG. 2 is a block diagram of a computer system in accordance with the invention.

FIG. 2 shows a functional block diagram of computer system 10. System 10 has a processor 30 and one or more additional forms of computer-readable storage media. Specifically, system 10 includes a volatile memory 32 (e.g., RAM), and a non-volatile memory 34 interconnected by an internal bus 36. The non-volatile memory 34 can be implemented as integrated circuit chips (e.g., ROM, EEPROM), disk drive(s) (e.g., floppy, optical, hard), or a combination of both. In this invention, a portion of non-volatile memory 34 or volatile memory 32 is utilized as a low-latency memory device or cache, referred to as bridge memory. The time required to access any particular data within the bridge memory is significantly lower than that required to move from clip to clip when using a CD-ROM or DVD drive. For instance, the access time when reading from bridge memory is typically on the order of 20 to 90 nanoseconds, while the access time or latency of primary storage medium 24 is in the range of 200–300 milliseconds.

The display 14 is connected to the bus 36 through appropriate hardware interface drivers (not shown). Additionally, the input devices 15, 16 are connected to supply data to the bus 36 via appropriate I/O ports. Floppy drive 18 and access device 22 are also connected through bus 36.

The computer 10 runs an operating system 40 that is stored on the non-volatile memory 34 and executes on the processor 30. One preferred operating system is a Windows® brand operating system sold by Microsoft Corporation, such as Windows® 95 or Windows NT™ or other derivative versions of Windows®. However, other operating systems which provide windowing environments may be employed, such as the Macintosh OS from Apple Corporation and the OS/2 Presentation Manager from IBM.

A computer application 42 is stored in the non-volatile memory 34. When the computer application 42 is activated, processor 30 reads and executes instructions from memory to perform steps which will be described below. The application 42 can be loaded into the memory 34 or 32 from the floppy diskette 20 or CD-ROM 24, or alternatively, downloaded from a network via a network port (not shown). In this example, the computer program is either a multimedia authoring application tool or a multimedia application itself.

Although the invention is described within the illustrated context of a familiar desktop computer, aspects of the invention might also be employed in other forms of computing devices, such as laptop computers, hand-held computers, set-top boxes, game devices, and other types of computing and entertainment devices. In these devices, applications may be configured to run on single-tasking operating systems.

The bridge memory of computer system 10 is used to cache bridge data from any media clip to which an immediate jump might be made. The bridge data for a media clip is the initial part or segment of the media clip, of a duration at least as long as the access time of the primary storage device. When the access time of primary storage medium 24 is between 200 and 300 milliseconds, the bridge data for any particular media clip will comprise at least the initial 300 milliseconds of the media clip.

The size or amount of the bridge data for a media clip will depend on the data rate of the media clip. For a media clip encoded using the MPEG-1 standard, the data transfer rate is 1.5 megabits per second. 300 milliseconds of such a media clip would therefore have a size of 450 kilobits.

In accordance with the invention, an application program delivers bridge data and loads it into bridge memory just before the bridge data might be needed. Before any seamless branch is allowed, the bridge memory must contain the bridge data for the media clip that is targeted by the branch. In order to accomplish this, the bridge data for any particular media clip is delivered and loaded into bridge memory during a previous media clip.

It is useful at this point to note one exception to the general practice of delivering bridge data during previous clips. This exception arises in some situations where "no-latency" branches are employed. It is possible for data to be arranged on a storage device so that some branches can be made seamlessly without buffering the bridge data of their target clips. For example, clips A and B might be arranged contiguously, along a continuous spiral of a DVD. When this is the case, the seamless branch from the end of or near the end of A to B is referred to as a no-latency branch. Otherwise, branches are referred to as "latent" branches. The targets of such branches are referred to as a no-latency targets and latent targets, respectively. It is not necessary to pre-deliver bridge data for media clips that are the targets of no-latency branches. Unless stated otherwise, branches discussed below are latent branches.

Computer system 10 is an example of a system that can be used either as an authoring system or as a run-time system for executing an authored multimedia application. The invention includes both of these aspects. When used as an authoring system, an interactive graphical application program is executed by processor 30. The application program allows an author to model a sequence of media clips and the jumps or branches between such clips. The application, as explained below, accounts for the physical characteristics of both the storage medium on which media clips will be stored and the computer system that will read and render the media clips. Specifically, the authoring program accounts for the read latency of the storage medium and the availability of bridge memory on the rendering computer system.

The authoring techniques described below recognize that bridge memory is a precious resource in many run-time environments. While the example system 10 is a relatively capable desktop computer, other run-time systems might have only very limited memory—perhaps no hard disk and only very limited electronic memory. Thus, an authoring system in accordance with the invention allows an author to make tradeoffs between bridge memory requirements and restrictions on seamless branches. These tradeoffs will become more apparent as the discussion progresses.

Figure 3:
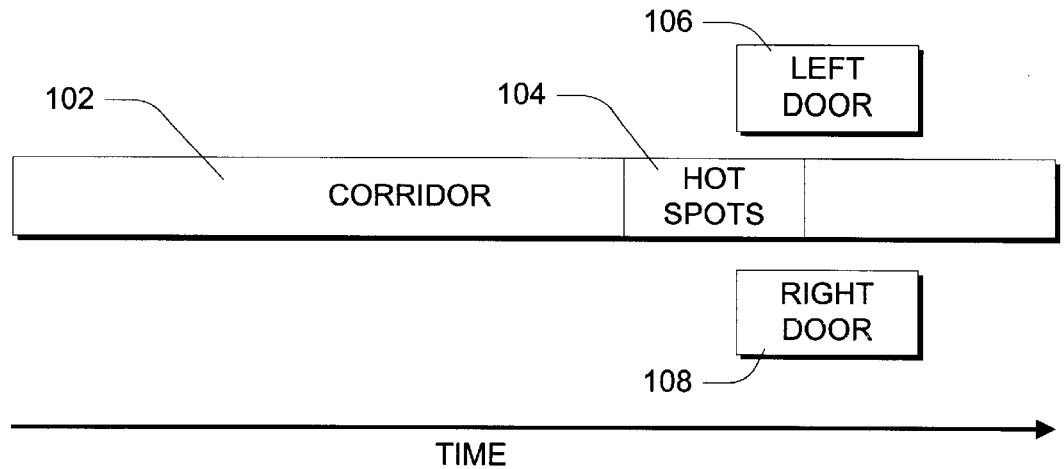
FIG. 3 is a timeline showing the time relationship of different video clips.
Figure 4:
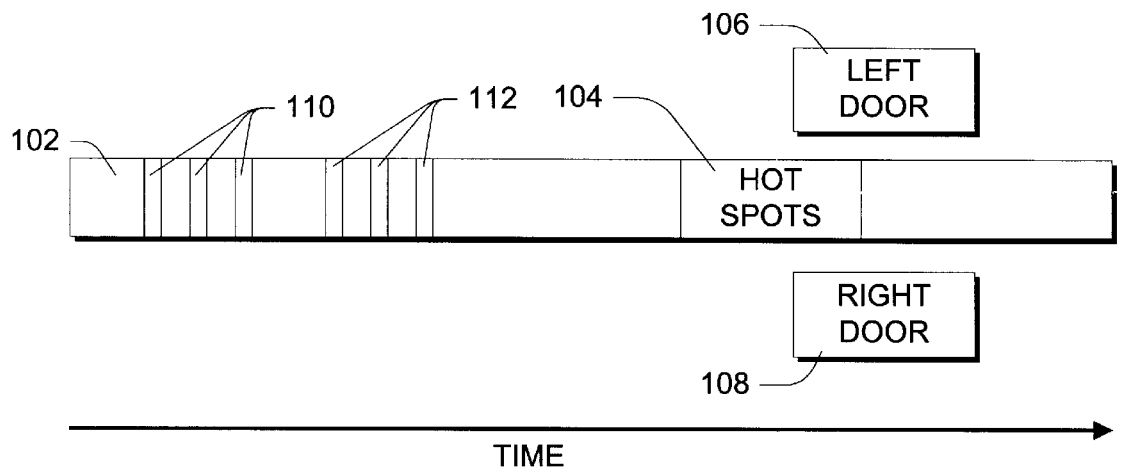
FIG. 4 is a timeline similar to that of FIG. 3, showing interleaving of bridge data in a carrier video clip.

FIGS. 3 and 4 illustrate one embodiment of the invention. In this embodiment of the invention, the bridge data for any particular media clip is positioned in and delivered during an immediately preceding media clip. Using this scheme, bridge memory needs to be large enough only to contain the bridge data for all clips that are targets of branches from any single source clip. This is a significant reduction over the prior art schemes which required bridge memory to be large enough to simultaneously hold the bridge data for all media clips in a media title.

As an example, FIG. 3 shows a timeline of a multimedia application having media clips that allow a user to navigate through a corridor. Initially, the application renders a first video clip 102 (referred to as the corridor clip) as the user moves through the corridor. At a predetermined time, the user is presented with an option to enter a left room or a right room by clicking on respective doors. Typically, the application would implement "hotspots" corresponding to the doors, on which the user would click. The user can make the choice any time during a "window of opportunity" indicated by box 104 in FIG. 3. If the user clicks on one of the doors, the application will abort the corridor video clip and immediately (and seamlessly) start a new video clip 106 or 108 (referred to as the left door clip and the right door clip, respectively). Otherwise, the corridor clip 102 will continue. In order to make an immediate and seamless transition from the corridor clip to either the left door clip or the right door clip, the bridge data from both of the door clips must be available in bridge memory before the user makes his or her selection—before the window of opportunity.

In this embodiment of the invention, pre-delivery of bridge data is achieved by combining the bridge data for a particular clip that is the latent target of a seamless branch (a target clip) with an upstream media clip. An upstream clip is any media clip that is guaranteed to be rendered before the target clip.

As shown in FIG. 4, the bridge data in this embodiment of the invention is interleaved in the initial parts of the immediately upstream media clip. An immediately upstream clip is one from which a branch is made directly to the target clip. In this example, the left and right door clips are interleaved and delivered to bridge memory during delivery of the corridor clip—the corridor clip is immediately upstream of both the left and right door clips.

In FIG. 4, the segments of corridor video clip 102 marked by reference numeral 110 indicate times when the bridge data for the left door clip 106 are delivered. The segments marked by reference numeral 112 indicate times when the bridge data for the right door clip 108 are delivered. By the time the hotspots are enabled (during window of opportunity 104), all bridge data has been delivered to bridge memory and a branch can be made seamlessly to either of the door clips. While the storage access device is seeking the location on the primary storage medium containing the chosen door clip, the corresponding bridge data is rendered from bridge memory. Once the correct location has been found, remaining data is read from the primary storage medium. Once the branch has been implemented, bridge memory is cleared in preparation for receiving the next set of bridge data, which will be delivered during the selected door clip.

There are a number of various ways in which bridge data can be combined or interleaved with media clips. However, data may not be interleaved at arbitrary locations in an upstream clip. For example, the initial part of a clip may itself have been cached, and therefore should not itself contain any interleaved bridge data. Furthermore, interleaving must not interfere with the normal timely delivery of the original media clip.

Consider a situation wherein upstream data is interleaved inside an MPEG video clip. Within the MPEG format, data is arranged in units referred to as "packs." For each MPEG pack, there is a residual data capacity that can be used without violating the timing constraints of the MPEG stream. This is a result of the difference between the maximum data transfer capacity of the storage medium and the actual required data rate of the MPEG data stream. The residual data capacity of individual packs can be used for interleaved bridge data.

In one embodiment of the invention, bridge data is transmitted as packets in "private stream 2" of the overall MPEG stream. For more detail regarding MPEG data formats, refer to the various MPEG-2 specifications.

It is desirable in some instances to specify a removal time along with the bridge data for each media clip. This time, specified in a format that is relative to the time stamping of the media clips themselves, indicates when the bridge data can be removed from bridge memory. The removal time essentially indicates the end of the user's window of opportunity with respect to a particular branch. Alternatively, it might be desirable in many other instances to simply clear bridge memory whenever a new media clip starts.

The scheme described above imposes one significant restriction on seamless branches: a seamless branch cannot take place during an initial part of a given media clip, since bridge data for subsequent target clips is being delivered during this time and is not yet completely loaded into bridge memory. In many situations, this might be acceptable. In others, it will not be acceptable.

More general methods are presented below. These methods allow an author to selectively relax the above restriction on the use of seamless branches, at the possible cost of higher bridge memory requirements. Generally, the methods allow an author to specify some media clips as non-carrier clips, while other clips are specified as carrier clips. Bridge data is not delivered during non-carrier clips. Rather, bridge data that would have been delivered during a non-carrier clip is delivered during an earlier carrier clip. While this increases the amount of data that is delivered during the earlier carrier clip, it allows branches to take place immediately after beginning a non-carrier clip. For this reason, non-carrier clips are also referred to as unrestricted clips.

Media operations may need to be restricted in the following ways to work within the framework described. First, target clips should be entered at their beginnings. Second, no storage medium seeks (movement from one location or spiral to another) are allowed within individual clips. Third, no fast forward or rewind operations are allowed. These restrictions are necessary, depending on the particular delivery mechanism being used, to ensure that required data is cached.

Authoring a media title in accordance with this aspect of the invention begins with a step of specifying a plurality of continuous media clips such as audio or video clips, and by then connecting the media clips with a plurality of directed branches from source clips to target clips. Each branch can be one of two major classes—seamless or non-seamless. For convenience, a target clip that is targeted by a branch from a source clip will be referred to as a target of the source clip.

Bridge data is identified for every target clip. The bridge data, as described above, comprises an initial part of a target clip that can be rendered during the storage medium access latency. The size of bridge data for an individual target clip can be determined in accordance with the discussion above.

Figure 5:
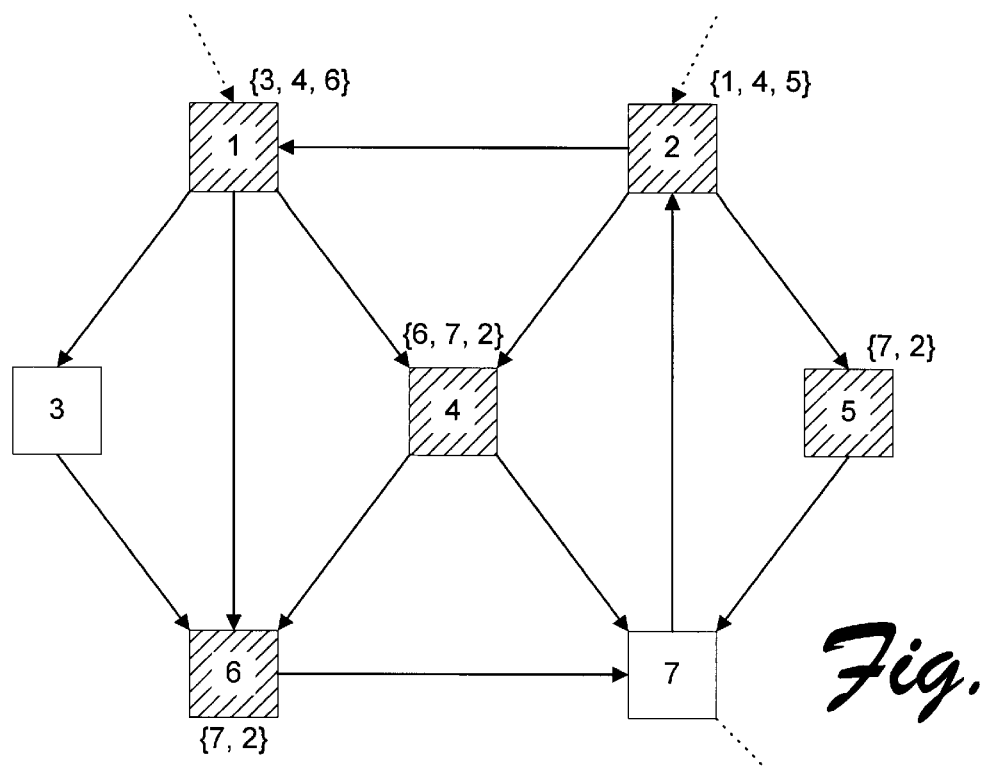
FIGS. 5–9 are graphs showing seamless media clip domains in accordance with the invention.

FIG. 5 shows media clips modeled as individual nodes on a graph. Seamless branches are represented by solid arrows connecting the nodes. A set of media clips connected in this manner is referred to as a seamless domain of media clips. A seamless domain is a set of media clips in which a series of seamless branches exists between every pair of clips. More specifically, a seamless domain is a set of media clips in which every pair of clips is related. Clips A and B are related if they are connected by a seamless branch, regardless of its direction, or if there is a sequence of clips starting with A and ending with B in which all successive clips are related. Furthermore, only one branch of any particular type (seamless or non-seamless) can join media clips in the same direction.

A particular multimedia title may contain a number of seamless domains. Each seamless domain will have certain clips into which non-seamless branches will be made to enter the seamless domain. These clips are referred to as entry clips. Non-seamless branches are represented as dashed arrows. Clips 1 and 2 of FIG. 5 are entry clips.

Certain media clips are assigned to be non-carrier clips, and other media clips are designated to be carrier clips. At least some of these assignments are preferably made interactively by an author of a multimedia title. In the model illustrated in FIG. 4, carrier clips are shown as hatched nodes.

Delivery of bridge data from a seamless domain is scheduled based on the assignments of carrier and non-carrier clips. Specifically, bridge data of corresponding media clips is scheduled for delivery during upstream media clips that have been designated as carrier clips. However, delivery of bridge data for a particular media clip is not scheduled during an immediately upstream media clip if the immediately upstream media clip is a non-carrier clip. Rather, such bridge data is scheduled for delivery during a carrier clip that is further upstream than the immediately upstream clip.

During rendering of a carrier clip, an application program reads bridge data that is delivered along with the carrier clip, and loads the bridge data into bridge memory. The bridge data is used when rendering subsequent seamless branches. The bridge memory is cleared at times corresponding to delivery of respective carrier clips—preferably before beginning the rendering of each carrier clip. Accordingly, the amount of bridge memory required to execute an application program is equal to the largest sum of bridge data that is delivered during any single carrier clip.

This scheme places a restriction only on carrier clips: no seamless jump can be made from a carrier clip until the bridge data accompanying that carrier clip has been delivered. However, seamless branches can take place at any time within non-carrier (unrestricted) clips.

FIG. 5 shows a total of seven clips, labeled 1 through 7. Clips 3 and 7 have been designated non-carrier clips (indicated as square nodes with no hatching), and the remaining clips have been assigned to be carrier clips (indicated as hatched square nodes). Each carrier clip has a set of bridge data, referred to herein as a carrier data set, that is scheduled for delivery during that carrier clip. At a minimum, a carrier data set includes the bridge data for each clip that is the immediate target of a branch from the carrier clip—the initial part of the immediate target clip. However, bridge data cannot be delivered during non-carrier clips. Accordingly, such bridge data, that would otherwise be delivered during such clips, must be delivered during upstream carrier clips. Although this increases bridge memory requirements, it relaxes restrictions on the timing of seamless branches within the non-carrier clips.

Associated with each carrier clip of FIG. 5 is an identification of a carrier data set. For example, carrier clip 4 has an associated carrier data set that is identified as {6, 7, 2}. This nomenclature indicates that the bridge data of media clips 6, 7, and 2 must be delivered during carrier clip 4. Of these, clips 6 and 7 are immediately downstream clips. Clip 2, however, is not immediately downstream of clip 4. Nevertheless, carrier clip 4 must carry the bridge data of clip 2 so that a seamless jump can be made from non-carrier clip 7 without requiring delivery of bridge data curing clip 7.

The bridge data delivery scheme illustrated by FIG. 5 can be described in general methodological terms. Generally, a method in accordance with this aspect of the invention includes specifying a plurality of continuous media clips, designating seamless and non-seamless branches from source media clips to target media clips, and identifying seamless domains. Such a method further comprises assigning at least one of the media clips in each domain to be a carrier clip. At a minimum, strictly speaking, on any possible entry path (sequence of clips starting from entry clip) into seamless domain at least one clip has to be assigned as a carrier before any seamless latent branch may be encountered. In a common case when all entry clips have latent outgoing seamless branches this simply means that all entry clips have to be assigned to be carriers. A method in accordance with the invention further includes a step of assigning some of the media clips (other than entry clips) to be non-carrier clips.

This aspect of the invention further includes a step of scheduling delivery of bridge data for corresponding media clips during upstream media clips that have been assigned as carrier clips. Further steps include disallowing seamless branches during initial parts of carrier clips until bridge data has been delivered.

Further steps include identifying the bridge data that will be required to begin rendering any target clip of seamless branch from a particular non-carrier source clip, and scheduling such bridge data for delivery during a carrier clip that is upstream of said particular non-carrier source clip. The bridge data comprises the initial part of a media clip that is rendered during the access latency of the storage medium, during the seek for the media clip.

In more specific terms, a method in accordance with the invention includes identifying and compiling a target bridge set corresponding to every carrier and non-carrier media clip that is the target of a seamless jump. A target bridge set for a particular media clip is defined recursively as a union of (a) target bridge sets of non-carrier clips that are immediate targets of the particular media clip and (b) bridge data of media clips that are immediate latent targets of the particular media clip. Target bridge sets corresponding to carrier clips can be scheduled for delivery during these carrier clips. Target bridge sets are not delivered during non-carrier clips.

As an example, carrier clip 4 of FIG. 1 has a target bridge set that includes the target bridge set of non-carrier clip 7, as well as the bridge data of clips 6 and 7. The target bridge set of non-carrier clip 7 is simply the bridge data of clip 2. Accordingly, the target bridge set of clip 4 comprises the bridge data of clip 2, 6, and 7.

A method in accordance with the invention further comprises defining a carrier data set corresponding to each carrier clip. A carrier data set for a particular carrier clip comprises simply the clip's target bridge set. The invention further includes a step of scheduling each carrier data set to be delivered during its corresponding carrier clip.

Actual delivery of carrier data sets to bridge memory is preferably implemented using the interleaving scheme described above. However, other methods of bridge data delivery could also be utilized. For example, a second high-latency storage device such as a CD-ROM could be used to provide bridge data at scheduled times. The techniques described herein are capable of modeling various different sources of data, including network sources such as a multimedia network server with guaranteed upper bound of latency.

Figure 6:
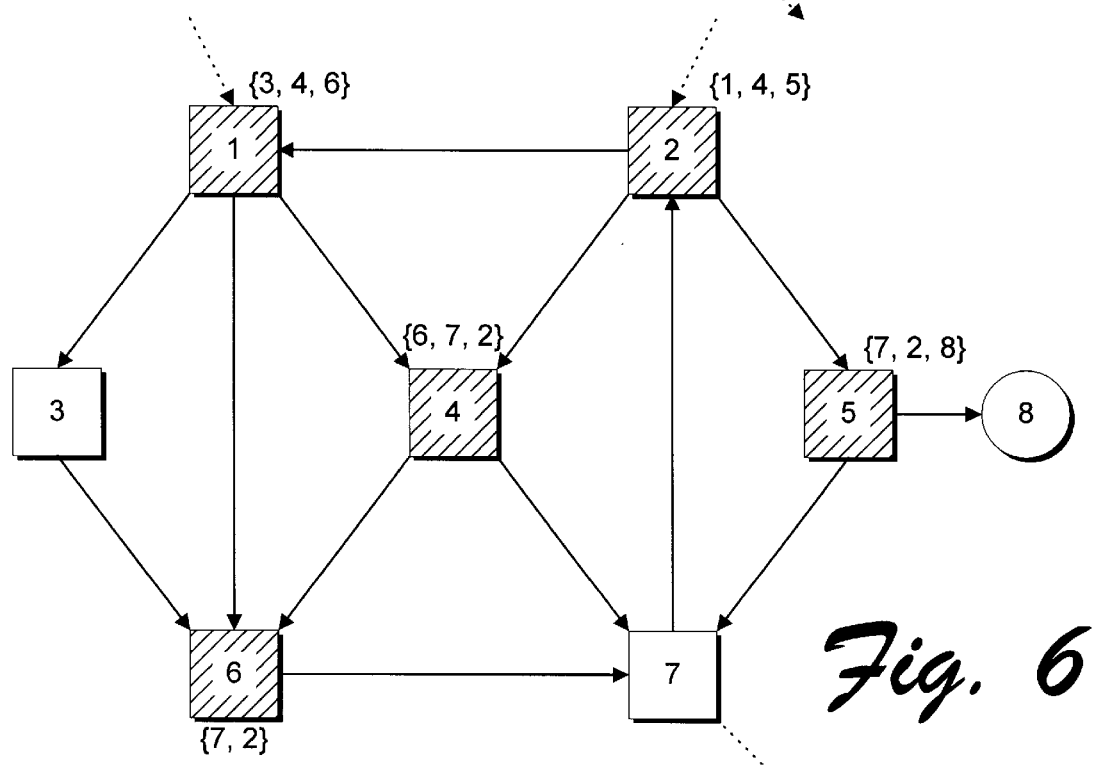

FIG. 6 shows the addition of a data clip 8 to the illustrated seamless domain. Data clip 8 is the target of a seamless branch from carrier clip 5. What this means is that data clip 8 will be utilized sometime during clip 5, but that clip 5 will continue to be rendered even after data clip 8 is utilized. For purposes of this discussion, data clips are defined as non-carrier clips or nodes that have no outgoing branches. Bitmaps, scripts, cursors, and fonts are examples of data clips. These are items that are primarily supplemental to the main media clip, and may be things other than continuous media streams.

The bridge data of a data clip is the entire data clip. In FIG. 6, then, the target bridge set of clip 5 consists of the bridge data clips 7 and 2, and data clip 8 in its entirety.

As noted above, it is possible for data to be arranged on a storage device so that some branches can be made seamlessly without buffering the bridge data of their target clips. For example, clips A and B might be arranged contiguously, along a continuous spiral of a DVD-ROM. When this is the case, the seamless branch from the end of or near the end of A to B is referred to as a no-latency branch. Since no bridge data buffering is required for this type of branch, the scheduling step noted above does not include scheduling delivery of bridge data for of no-latency target clips: a target bridge set corresponding to a particular media clip does not include bridge data of any media clips that are targeted by no-latency branches from said particular media clip.

Figure 7:
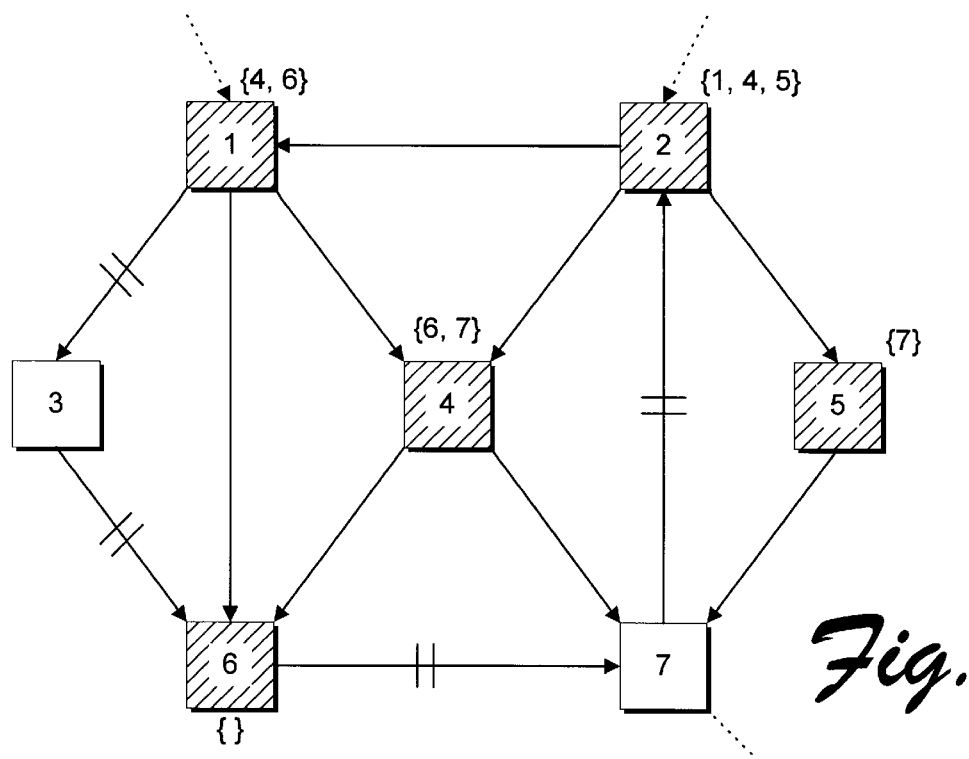

FIG. 7 illustrates the effect of configuring four of the seamless branches as no-latency branches. Specifically, the branches from clip 1 to clip 3, from clip 3 to clip 6, from clip 6 to clip 7, and from clip 7 to clip 2 have been changed to no-latency branches (identified by the pair of lines perpendicular to each of the corresponding arrows). This step, performed by an author after carefully considering the layout of the seamless domain, significantly reduces the requirements for pre-delivering bridge data. For example, the carrier data set corresponding to clip 1, previously consisting of the bridge data from clips 3, 4, and 6, now consists of the bridge data from only clips 4 and 6. The bridge data from clip 3 need no longer be buffered because there is a no-latency branch to clip 3. Timing restrictions have also been relaxed, since not as much bridge data needs to be delivered during the respective carrier clips. The extra data capacity of these carrier clips can be used for delivering other data.

Figure 8:
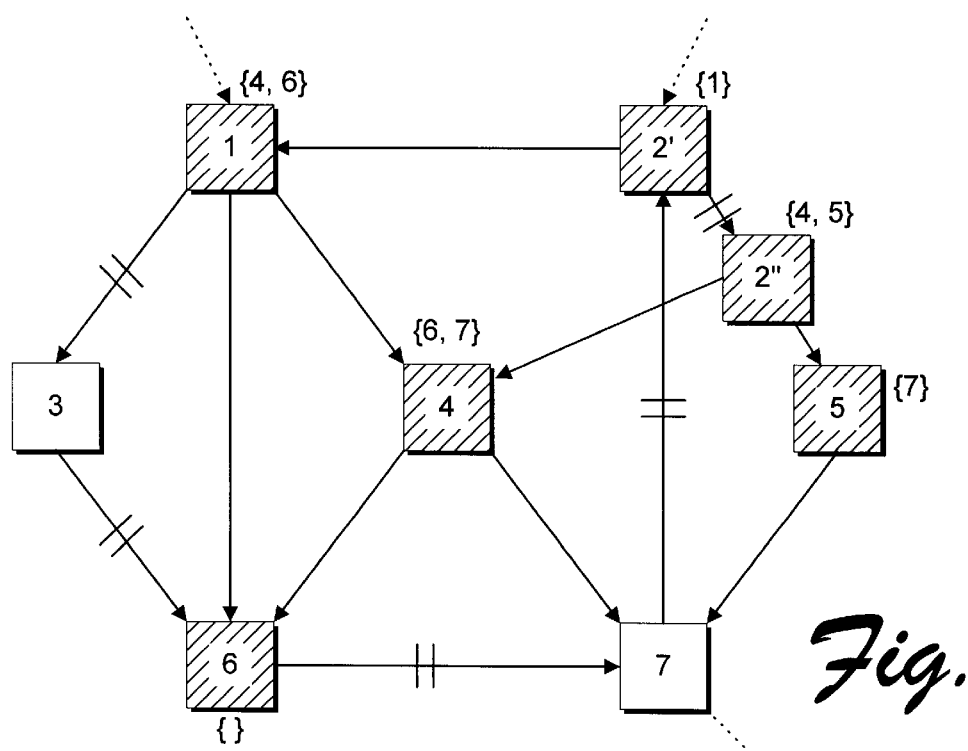

It is also possible to reduce buffering requirements by breaking existing clips into separate clips. For example, suppose that only a branch to clip 1 is possible during the first part of clip 2, and branches to clips 4 and 5 are available only during the latter part of clip 2. As shown in FIG. 7, clip 2 can be represented as two clips 2' and 2", connected by a no-latency branch. The result, when integrated into the overall seamless domain, is shown in FIG. 8. Buffering requirements have been reduced even further by taking this step.

The methods and modeling techniques discussed herein form the basis of an automated authoring tool to be used by an author of a multimedia title to ensure that data can be delivered seamlessly within predefined bridge memory constraints. Alternatively, such a tool can be used to simply determine bridge memory requirements given a predetermined configuration of carrier and non-carrier clips.

An authoring tool in accordance with the invention allows an author to graphically specify a plurality of media clips as nodes on a graph, as in to the presentation of FIG. 4. In response to user instructions, the authoring tool allows the author to specify seamless branches between the nodes. In one embodiment, a user is allowed to designate which clips should be non-carrier or unrestricted clips. The authoring tool then designates all other clips to be carrier clips. Once a seamless domain has been defined by the author in this fashion, the authoring tool calculates bridge memory requirements based on the particular assignment of carrier and non-carrier clips, and notifies the user of the minimum size of bridge memory required to accommodate the current layout of the seamless domain. The user can then reassign individual media clips to be carrier or non-carrier clips to change bridge memory requirements. The user can also specify no-latency branches to further reduce bridge memory requirements.

The authoring tool calculates the minimum size of bridge memory required for any configuration of carrier and non-carrier nodes by identifying the size of the largest carrier data set associated with a carrier clip. Thus, for respective carrier clips, the authoring tool performs a step of summing the sizes of target bridge sets corresponding to any immediate targets of said respective carrier clips. The largest sum of target bridge sets corresponds to the minimum requirement for bridge memory.

The authoring tool can also be configured to automatically assign certain clips as non-carrier clips to take advantage of a given size of available bridge memory, and to automatically utilize no-latency branches when such branches are possible.

The invention also includes a method of utilizing bridge memory in a computer system such as the one illustrated in FIGS. 1 and 2. Steps in accordance with this aspect of the invention include reading media clips from a storage medium such as a CD-ROM or a DVD-ROM and rendering the media clips. A further step, performing while reading a particular media clip, comprises also reading the bridge data from one or more individual target clips from the storage medium. The bridge data is stored or buffered in bridge memory as it is delivered and read. Bridge data corresponding to a particular target clip is rendered when branching to the target clip, during the access latency of the storage device. The bridge memory is cleared before every carrier clip. More generally, bridge data of a particular target clip is cleared from bridge memory after a branch to the target clip is no longer allowed.

Figure 9:
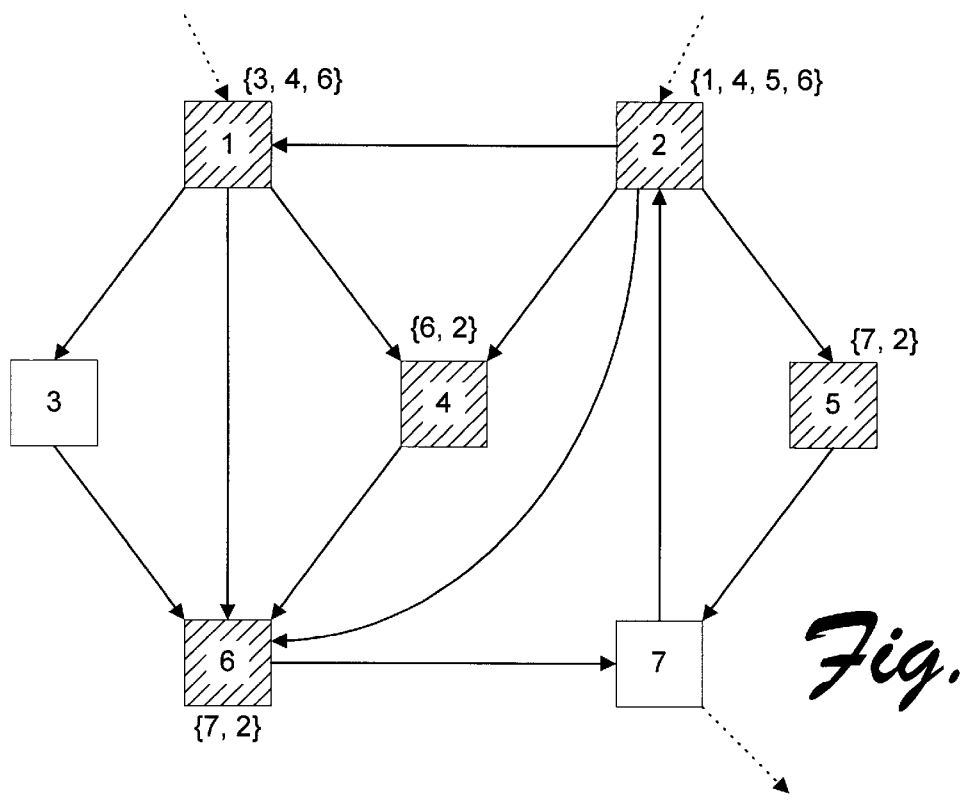

Alternatively, the carrier data sets can contain instructions designating which clips should be cleared from bridge memory. Further optimization of carrier data sets can be achieved in this way by ensuring that a carrier data set or target bridge set corresponding to a particular carrier clip does not include any bridge data that is included in the target bridge sets of all media clips that are immediately upstream of the particular carrier clip. For example, consider clip 4 of FIG. 9. The target bridge set for clip 4 includes the bridge data of clips 6 and 2. Clip 4 has only two immediately upstream clips: 1 and 2. The target bridge sets corresponding to these clips each include the bridge data for clip 6. Accordingly, whenever clip 4 is initiated, bridge memory will already contain the bridge data for clip 6, and it is unnecessary to deliver it again. Rather, it can be left in bridge memory.

The reading of bridge data and the management of bridge memory are preferably performed by an operating system. If this is the case, an application can use normal file-related operating system commands to retrieve desired files. To manage bridge memory at run time, a variety of clip attributes similar to file attributes may be defined and maintained by the run-time operating environment to enable identification of media clips, their domains, and their types, without requiring the operating environment to actually access the media clips. During playback an application may be notified of significant events in bridge memory management such as the availability of bridge data for a particular target.

The invention further includes a computer-readable storage medium having media clips and interleaved bridge data as illustrated in FIG. 4, and a method of storing such media clips and bridge data on the storage medium. A plurality of continuous media clips are stored on the storage medium, wherein the media clips are to be interconnected during rendering by seamless branches from upstream source clips to downstream target clips. The storage medium is of the type described above that imposes an access latency between media clips.

The bridge data for target clips is combined with upstream media clips on the storage medium. In one embodiment of the invention, the bridge data for any particular target clip is combined with the immediately upstream source clip. In another embodiment, the bridge data can be combined with carrier clips that are further upstream than the immediately upstream media clip. This happens primarily when the immediately upstream media clip has been assigned as a non-carrier clip. As discussed above, the preferred method of combining the bridge data with a carrier clip is to interleave the bridge data.

The invention is a notable improvement over prior art systems and methods, in that it allows bridge memory requirements to be significantly reduced. Furthermore, it allows an author of a multimedia title to vary restrictions on seamless branching in order to utilize available memory. Creative decisions are left to the author, who can make decisions regarding which branches must be seamless, which must be non-restricted, and where such branches are placed.

The invention allows use of an automated authoring tool. Such a tool allows an author to represent a seamless domain in graphical format, and reports the actual required bridge memory for any particular layout. The authoring tool can also make decisions for the author, such as where to place carrier clips and where no-latency branches can most effectively be utilized.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of authoring a media title comprising a plurality of continuous media clips connected by seamless branches, the media clips having bridge data, the method comprising:

assigning certain media clips to be non-carrier clips;

assigning other media clips to be carrier clips;

identifying a target bridge set corresponding to respective media clips wherein a target bridge set corresponding to a particular media clip comprises (a) target bridge sets of all non-carrier clips that are immediate targets of the particular media clip and (b) the bridge data of all carrier clips that are immediate targets of the particular media clip:

identifying the largest target bridge set, wherein the largest target bridge set corresponds to a minimum requirement for bridge memory; and scheduling delivery of bridge data for media clips during immediately upstream carrier clips.

2. A method as recited in claim 1, wherein some of the non-carrier clips are data clips having no outgoing branches, wherein the bridge data of a data clip comprises the entire data clip.

3. A method as recited in claim 1, further comprising a step of disallowing seamless branches during initial parts of carrier clips until bridge data has been delivered.

4. A method as recited in claim 1, wherein some of the branches are no-latency seamless branches, wherein the scheduling step does not include scheduling delivery of bridge data for target clips of no-latency seamless branches.

5. A method as recited in claim 1, further comprising a step of calculating bridge memory requirements based on a particular assignment of carrier and non-carrier clips.

6. A method as recited in claim 1, further comprising the following additional steps:

calculating bridge memory requirements based on a particular assignment of carrier and non-carrier clips;

reassigning individual media clips to be carrier or non-carrier clips to change bridge memory requirements.

7. A method of scheduling bridge data delivery in a seamless domain of media clips having bridge data and having seamless branches between the media clips, the method comprising the following steps:

assigning at least one of the media clips to be a carrier clip and at least another of the media clips to be non-carrier clip, wherein said carrier and non-carrier clips are connected by seamless branches to target media clips;

defining target bridge sets corresponding to respective media clips, wherein a target bridge set for a particular media clip comprises a union of (a) target bridge sets of non-carrier clips that are immediate targets of the particular media clip and (b) bridge data of media clips that are immediate targets of the particular media clip; and scheduling the target bridge set of a particular carrier clip to be delivered during said carrier clip.

8. A method as recited in claim 7, wherein the target bridge set corresponding to a particular carrier clip does not include any bridge data that is included in the target bridge sets of all media clips that are immediately upstream of the particular carrier clip.

9. A method as recited in claim 7, further comprising a step of designating any entry media clip having an outgoing seamless branch as a carrier clip.

10. A method as recited in claim 7, further comprising a step of assigning further media clips to be carrier clips as required to limit target bridge sets to a predetermined bridge memory size.

11. A method as recited in claim 7, wherein some of the non-carrier clips are data media clips having no outgoing branches, and wherein the bridge data corresponding to a particular data clip comprises the whole data clip.

12. A method as recited in claim 7, further comprising a step of interleaving the target bridge set of a particular carrier clip in said carrier clip.

13. A method as recited in claim 7, wherein said target bridge set corresponding to said particular media clip does not include bridge data of any media clips that are targeted by no-latency branches from said particular media clip.

14. A media authoring tool that utilizes the steps of claim 7 to assist an author in preparing a media work.

15. A computer-readable storage medium containing computer-executable instructions for performing the steps of claim 7.

16. A method of determining minimum requirements for bridge memory in a system having a plurality of continuous media clips interconnected by seamless branches from source clips to target clips, each media clip being designated as a carrier clip or a non-carrier clip and having bridge data, the method comprising the following steps:

identifying target bridge sets corresponding to respective media clips, wherein a target bridge set for a particular media clip comprises a union of (a) target bridge sets of non-carrier clips that are immediate targets of the particular media clip and (b) bridge data of media clips that are immediate targets of the particular media clip; and determining sizes of the target bridge sets;

wherein the minimum requirement for bridge memory corresponds to the largest target bridge set.

17. A method as recited in claim 16, wherein the target bridge set corresponding to a particular carrier clip does not include any bridge data that is included in the target bridge sets of all media clips that are immediately upstream of the particular carrier clip.

18. A method as recited in claim 16, wherein some of the non-carrier clips are data clips having no outgoing branches, wherein the bridge data corresponding to a particular data clip comprises the whole data clip.

19. A method as recited in claim 16, wherein said target bridge set corresponding to said particular media clip does not include bridge data of any media clips that are targeted by no-latency branches from said particular media clip.

20. A media authoring tool that utilizes the steps of claim 16 to assist an author in preparing a media work.

21. A computer-readable storage medium containing computer-executable instructions for performing the step of claim 16.

22. A computer-readable storage medium containing computer-executable instructions for performing steps comprising:

specifying a plurality of continuous media clips;

designating seamless branches from source media clips to target media clips, in response to user instructions;

designating as carrier clips a plurality of media clips that are not assigned by a user to be non-carrier clips;

defining target bridge sets corresponding to respective media clips, wherein a target bridge set for a particular media clip comprises a union of (a) target bridge sets of non-carrier clips that are immediate targets of the particular media clip and (b) bridge data of media clips that are immediate targets of the particular media clip; and scheduling the target bridge set of a particular carrier clip to be delivered during said carrier clip.

23. A computer-readable storage medium as recited in claim 22, wherein the target bridge set corresponding to a particular carrier clip does not include any bridge data that is included in the target bridge sets of all media clips that are immediately upstream of the particular carrier clip.

24. A computer-readable storage medium as recited in claim 22, containing further instructions for performing additional steps comprising:

calculating the minimum size of bridge memory required for any configuration of carrier and non-carrier nodes by identifying the size of the largest target bridge set;

notifying the user of said minimum size of bridge memory.

25. A computer-readable storage medium as recited in claim 22, containing further instructions for performing an additional step of assigning any entry media clip having an outgoing seamless branch to be a carrier clip.

26. A computer-readable storage medium as recited in claim 22, containing further instructions for performing an additional step of assigning further media clips to be carrier clips as required to limit all target bridge sets to a predetermined bridge memory size.

27. A computer-readable storage medium as recited in claim 22, wherein some of the non-carrier clips are data media clips having no outgoing branches, and wherein the bridge data corresponding to a particular data clip comprises the whole data clip.

28. A computer-readable storage medium as recited in claim 22, containing further instructions for performing an additional step of interleaving target bridge sets in corresponding carrier clips.

29. A computer-readable storage medium as recited in claim 22, wherein said target bridge set corresponding to said particular media clip does not include bridge data of any media clips that are targeted by no-latency branches from said particular media clip.

* * * * *